United States Patent
Zwilling et al.

(10) Patent No.: US 8,095,511 B2
(45) Date of Patent: Jan. 10, 2012

(54) DATABASE DATA RECOVERY SYSTEM AND METHOD

(75) Inventors: Michael J. Zwilling, Redmond, WA (US); Gregory A. Smith, Carnation, WA (US); Rajeev B. Rajan, Kirkland, WA (US); Jakub Kulesza, Bellevue, WA (US); Peter Byrne, Bellevue, WA (US); Shashikant Brijmohan Khandelwal, Stanford, CA (US); Mark S. Wistrom, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1009 days.

(21) Appl. No.: 10/833,541

(22) Filed: Apr. 28, 2004

(65) Prior Publication Data

US 2004/0267835 A1 Dec. 30, 2004

Related U.S. Application Data

(63) Continuation-in-part of application No. 10/611,774, filed on Jun. 30, 2003, now Pat. No. 7,395,278.

(60) Provisional application No. 60/547,641, filed on Feb. 25, 2004.

(51) Int. Cl.
*G06F 7/00* (2006.01)
*G06F 17/00* (2006.01)

(52) U.S. Cl. ......... 707/649; 707/674; 707/683; 707/684

(58) Field of Classification Search .................. 707/202, 707/204, 200, 8, 649, 674, 683, 684; 711/114
See application file for complete search history.

(56) References Cited

U.S. PATENT DOCUMENTS

| | | | | |
|---|---|---|---|---|
| 5,261,102 A | * | 11/1993 | Hoffman | 713/200 |
| 5,455,946 A | * | 10/1995 | Mohan et al. | 707/202 |
| 5,517,643 A | * | 5/1996 | Davy | 711/173 |
| 5,857,208 A | * | 1/1999 | Ofek | 707/202 |
| 5,870,758 A | * | 2/1999 | Bamford et al. | 707/201 |
| 5,884,328 A | * | 3/1999 | Mosher, Jr. | 707/202 |
| 6,065,018 A | | 5/2000 | Beier et al. | |
| 6,438,749 B1 | | 8/2002 | Chamberlain | |
| 6,453,325 B1 | * | 9/2002 | Cabrera et al. | 707/204 |
| 6,487,677 B1 | * | 11/2002 | Jantz et al. | 714/2 |

(Continued)

OTHER PUBLICATIONS

Lahiri et al.—"Fast-Start: Quick Fault Recovery in Oracle"—Proceedings of the 2001 ACM SIGMOD, International Conference on Management of Data, vol. 30, Issue 2, Jun. 2001 (pp. 593-598).*

(Continued)

*Primary Examiner* — John E Breene
*Assistant Examiner* — Anh Ly
(74) *Attorney, Agent, or Firm* — Workman Nydegger

(57) ABSTRACT

The present invention relates to a system and method of data restoration, for instance, after the occurrence of a user error. In particular, snapshot database can be maintained that stores a copy of database data. The snapshot database does not have to store a complete copy of all data on a source database, but rather shares data that is common to both but not necessarily identical. If an error occurs on the primary database then the database can be reverted back to a point in time prior to the error by replacing source database files with snapshot files. Additionally, an undo component can be employed in conjunction with the snapshot to approach an error to a finer grained point in time. In brief, the present invention can restore a database much faster and simpler, while utilizing less space and resources than conventional data restoration technologies.

26 Claims, 15 Drawing Sheets

U.S. PATENT DOCUMENTS

| | | |
|---|---|---|
| 6,553,388 B1 | 4/2003 | Perks |
| 6,618,822 B1* | 9/2003 | Loaiza et al. ............ 707/202 |
| 6,795,895 B2* | 9/2004 | Merkey et al. ............ 711/114 |
| 6,898,608 B2 | 5/2005 | Hopeman et al. ......... 707/202 |
| 7,010,553 B2* | 3/2006 | Chen et al. ............... 707/203 |
| 7,043,503 B2* | 5/2006 | Haskin et al. ............. 707/200 |
| 7,051,050 B2* | 5/2006 | Chen et al. ............... 707/200 |
| 7,181,476 B2* | 2/2007 | Lee et al. .................. 707/203 |
| 2002/0007363 A1* | 1/2002 | Vaitzblit ................... 707/202 |
| 2002/0178146 A1* | 11/2002 | Akella et al. ............. 707/2 |
| 2003/0028736 A1 | 2/2003 | Berkowitz et al. |
| 2003/0046260 A1* | 3/2003 | Satyanarayanan et al. ...... 707/1 |
| 2003/0093444 A1* | 5/2003 | Huxoll ..................... 707/204 |
| 2003/0158861 A1 | 8/2003 | Sawdon et al. |
| 2003/0158873 A1 | 8/2003 | Sawdon et al. |
| 2003/0167380 A1* | 9/2003 | Green et al. ............. 711/136 |
| 2003/0204534 A1* | 10/2003 | Hopeman et al. ......... 707/200 |
| 2003/0208511 A1* | 11/2003 | Earl et al. ................ 707/204 |
| 2003/0220935 A1* | 11/2003 | Vivian et al. ............ 707/102 |
| 2004/0054643 A1* | 3/2004 | Vemuri et al. ........... 707/1 |
| 2004/0139128 A1* | 7/2004 | Becker et al. ........... 707/204 |
| 2004/0199549 A1* | 10/2004 | Oksanen .................. 707/201 |
| 2004/0220961 A1* | 11/2004 | Lee et al. ................ 707/102 |
| 2004/0267828 A1 | 12/2004 | Zwilling et al. |
| 2004/0267836 A1* | 12/2004 | Armangau et al. ....... 707/203 |

OTHER PUBLICATIONS

Ceri et al.—"Independent Updates and Incremental Agreement in Replicated Databases"—Distributed and Parallel Databases, vol. 2, No. 3 1995 (pp. 225-246).*

Suparna Bhattacharya, et al., Coordinating Backup/Recovery and Data Consistency Between Database and File Systems, ACM SIGMOD'2002, Jun. 4-6, 2002, pp. 500-511, Madison, Wisconsin, USA.

H. M. Gladney, Data Replicas in Distributed Information Services, ACM Transactions on Database Systems, Mar. 1989, pp. 75-97, vol. 14—No. 1.

Bruce Lindsay, et al., A Snapshot Differential Refresh Algorithm, Proceedings of the 1986 ACM SIGMOD international conference on Management of data, 1986, pp. 53-60, vol. 15—Issue 2.

Vincent Trans. International Search Report. Alexandria, Virginia. Apr. 28, 2005, 3 pages.

Elnozahy (Mootaz) E.N. et al, "A Survey of Rollback-Recovery Protocols in Message-Passing Systems", ACM Computing Surveys, Sep. 2002, 34(3), 375-408.

Mohan, C. et al., "ARIES: A Transaction Recovery Method Supporting Fine-Granularity Locking and Partial Rollbacks Using Write-Ahead Logging", ACM Transactions on Database Systems, 1992, 17(1), 94-162.

* cited by examiner

DATABASE DATA RECOVERY SYSTEM AND METHOD

CROSS-REFERENCE TO RELATED APPLICATIONS

The present invention claims the benefit of U.S. Provisional Application Ser. No. 60/547,641, filed Feb. 25, 2004 entitled Database Data Recovery System and Method, which is incorporated herein by reference. Furthermore, the present invention is a continuation-in-part of U.S. application Ser. No. 10/611,774, entitled Transaction Consistent Copy-On-Write Databases filed Jun. 30, 2003 which is also incorporated herein by reference.

TECHNICAL FIELD

The present invention relates generally to databases and more particularly toward database restoration technologies.

BACKGROUND

Database systems are quite prevalent in today's world. Databases store large quantities of information in such a manner so as to facilitate expeditious querying and ease of use. For example, in a conventional relational database, information can be organized as objects such as records, tables and indexes. Database engines provide a mechanism to retrieve and manipulate data from database tables upon specification of a query by a user. A query is typically expressed in some query language such as Structured Query Language (SQL). A query can specify one or more tables as well as rows and columns therein to be retrieved and otherwise manipulated. Upon proper specification of a query, the database engine retrieves data, performs any specified operations and produces a results table. Databases are popular and useful at least in part because of their ability to store large amounts of data, which can be efficiently retrieved and manipulated by simply specifying a query.

Unfortunately, user errors are a common problem in database systems. Usually, such errors occur when a database application or a user changes or deletes data by mistake and the database system correctly follows the command and promptly changes or deletes data. This is referred to in the art as the quick finger delete problem. For example, a user could issue a command to delete a table and forget to specify the "WHERE" clause causing more data to be deleted than intended. Additionally, a user may install a new application that modifies a database in a manner unbeknownst to the user. There are several conventional solutions to this problem. Generally, the most common solution is a full database restore to a point in time prior to the occurrence of a user error. Once restored, the database can be brought online and all changes, including the user error, are lost. However, a full database restore is time intensive sometimes taking days to complete.

Alternatively, data that was unintentionally modified can be remedied by extracting relevant information from a restore database and merging it back into the original database. A variation on this scheme is called log shipping.

Log shipping involves keeping a coping of the database on another secondary server in a restore state, but at a constant delay behind the original server. Log backups are applied to the secondary database only after a delay (e.g., 24 hours). If a user error occurs on an original database, and a database administrator notices the error within the delay, then the database administrator can revert to the secondary server because it already contains the database at a point in time prior to the error. Unfortunately, log shipping is complex requires many additional resources and space.

Restoring a database utilizing conventional systems and methodologies requires sizeable delays and therefore is generally an option of last resort. Furthermore, log shipping requires additional hardware and adds complexity to the database system. Mitigating errors is a large and important problem in database systems. Accordingly, there is a need in the art for a new system and method of restoring databases that is, among other things, both quick and simple.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to creation of and employment of a database snapshot. The invention mitigates problems associated with restoring a database, which takes time and is generally an option of last resort as well as log shipping which typically requires additional hardware and adds complexity to the database system. Reverting to a database snapshot alleviates some of these problems. According to an aspect of the subject invention, a database snapshot (DBSS) is a database that looks like a read only, point in time copy of another (source) database. The DBSS is not necessarily a complete copy of the source database; the two databases share data that is common to both, which makes the DBSS quick to create and space efficient. As the source database is modified, the original data is copied to space efficient storage for use by the DBSS to maintain its point in time view of the source database. If a user error occurs on the source database and a DBSS has been created before the error, then the database administrator has the option to revert the entire database back to the DBSS, which is at a point in time before the user error. All changes to the source database, including the user error, are lost. Moreover, the revert is generally much quicker than a normal restore and it does not require duplicate resources that log shipping does.

According to an aspect of the invention reversion to a database snapshot can comprise copying database snapshot file pages over a source or primary database, truncating a primary database, applying open uncommitted transactions to the database, and utilizing database logs to converge upon an event such as a user error.

In accordance with one aspect of the invention, a user or database administrator can create one or more database snapshots at various points in time. For example, if a user is going to be performing testing he/she could create a database snapshot to enable reversion to a previous database state or view. However, according to another aspect of the subject invention a monitor component can be employed to monitor a primary database and automatically create database snapshots upon certain happenings. For example, if the monitor detects or is able to infer that a new application is about to be installed it can initiate creation of a database snapshot to preserve the state of the database prior to alterations by the new application.

According to yet another aspect of the subject invention, a mirror database can be automatically updated to reflect changes made to a primary database upon reversion. Hence, a mirror database can be updated and synchronized without utilizing a lengthy full restore as is conventionally done.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
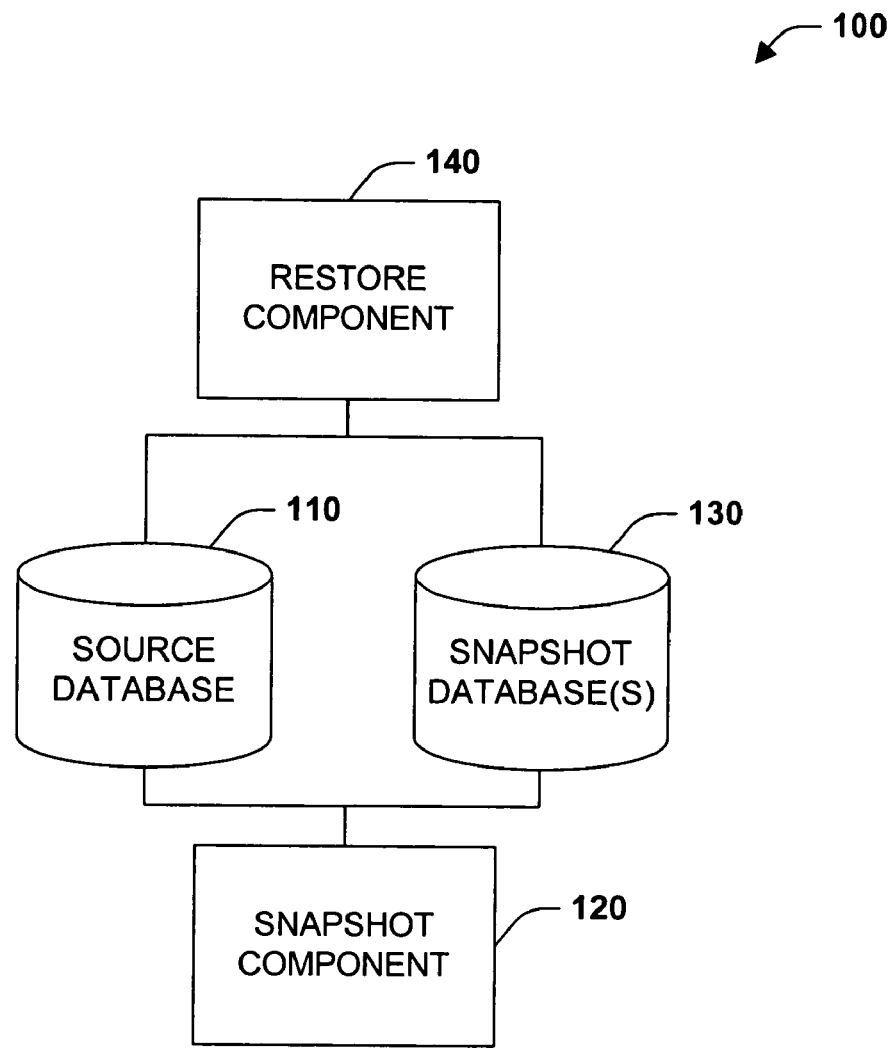
FIG. 1 is a schematic block diagram of a data restoration system in accordance with an aspect of the subject invention.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. For example, a computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the subject invention.
Restoration System Turning initially to FIG. 1, a data restoration system 100 is illustrated. Data restoration system 100 comprises a source database 110, snapshot component 120, a snapshot database 130, and a restore component 140. Source database 110 (also referred to hereinafter as primary database) houses large quantities of data in an organized manner so as to facilitate queries and other uses. Database 110 can be any kind of database including but not limited to a relational or multidimensional database. Snapshot component 120 generates a snapshot database(s) 130 (also referred to herein as DBSS for database snapshot) based in part on the source database. The snapshot database(s) 130 allow users to create a transaction consistent view of an existing source database 110 without making a complete copy thereof. As the source database 110 diverges from the snapshot database 130, the snapshot component 120 ensures that the snapshot database 130 obtains a copy of the data before it is modified, for instance, in page units. In other words, if a source database page contain the letter "A" and a transaction was executed that caused "A" to be changed to "B," then the corresponding snapshot database page would be written with and thus store the letter "A." According to an aspect of the subject invention, the snapshot database 130 can be a read only point in time copy of a source database 110. The DBSS is not necessarily a complete copy of the source database 110. The two databases can share data that is common to both, which makes the DBSS quick to create as well as space efficient. As the source database 110 is modified, the original data can be copied to space efficient storage for use by the DBSS to maintain its point in time view of the source database 110. Furthermore, it should be appreciated that there can be more than one snapshot database 130 associated with a source so as to provide multiple points of reversion. Additionally, the snapshot database 130 can be transient or persistent. Transient snapshots are internal volatile copies that are destroyed after crash, failure, or shutdown. Persistent snapshots are public copies that can be more securely kept on a storage device for use by other applications.

Restore component 140 utilizes the snapshot database 130 to restore the source database 110 to a point in time prior to an event. In accordance with an aspect of the subject invention, the event can correspond to a user error such as a quick finger delete where a user accidentally deletes data from the source table. Alternatively, an event can correspond to a system crash, lock up, or any other situation or scenario in which data is otherwise lost or manipulated. If an event occurs on the source database 110 and a snapshot database 130 has been created before the error, a database administrator has the option of employing the restore component 140 to revert the entire source database 110 back to the snapshot database 130, which is at a point in time before the event. The restore component 140 can utilize the data residing in snapshot database 130 to restore the source database 110 to a previous point in time before the event. For example, the snapshot database data can be written over the current source database values at corresponding locations. Alternatively, the snapshot database 130 can be populated with shared data and become the new source database. It should be appreciated that this restore process is typically much faster than conventional restore technologies as only sparse files need to be copied to the source database, rather than restoring the whole thing. Furthermore, the restore process is more efficient in that it does not require the duplicate resources, for example, that log shipping requires.

Figure 2:
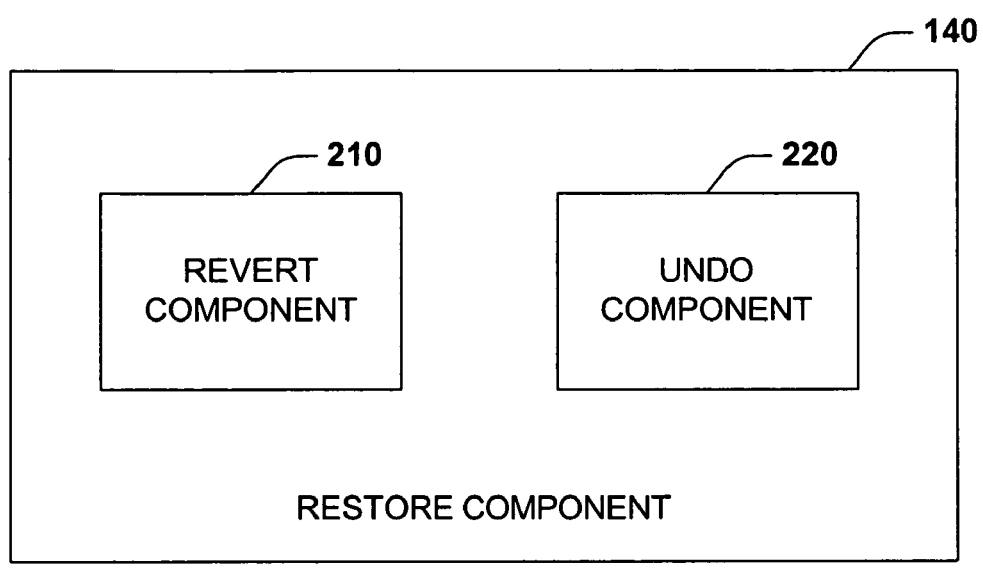
FIG. 2 is a schematic block diagram of a restore component in accordance with an aspect of the present invention.

FIG. 2 depicts a restore component 140 in accordance with an aspect of the subject invention. In particular, restore component comprises a revert component 210 and an undo component 220. The revert component 210 provides the main functionality in a restore according to the present invention, while the undo component 220 facilities fine grained restoration which converges upon an event such as an error. If a database snapshot has been created prior to the happening of an event, then the revert component 210 can restore a source database to a time prior to the event utilizing the sparse files in the database snapshot. The data files or pages that have been changed after the creation of a snapshot can be returned to their state at the time of the snapshot by copying the old values stored in the snapshot database to the source database. This results in data loss including an error, for instance, from the time the snapshot was created until the revert operation. For example, if a source database contained "A," "B," and "C" at the time a snapshot database was created and then later "B" was changed to "D," the snapshot database would contain "B" and the source database would comprise "A," "D," "B." The revert component could then restore the database to its values at the time of the snapshot by simply copying "B" over "D." However, at the time that the database snapshot was created there may be transactions in progress, which have not yet committed. These transactions are not captured by the database snapshot. Therefore, after a source database is reverted to a database snapshot those transactions are lost and operations (e.g., inserts, updates, deletes) that occur as a result of the transactions will not be executed.

The undo component 220 can be employed, among other things, to compensate for this inaccurate representation upon reversion. For example, the undo component 220 can store all open transactions at the time of snapshot database creation, which includes all transactions that began before the creation of the snapshot and terminated thereafter. These stored transactions can subsequently be utilized to roll forward the restored primary database to capture the open transactions and converge upon a restoration event. Furthermore, the undo component 220 can utilized conventional database logs that capture database changes at periodic intervals or upon the command of an administrator to converge even closer to an event such as an error thereby minimizing the loss of "good" transactions. Accordingly, the present invention facilitates database recovery at least as well as can conventionally be accomplished but at a much faster speed utilizing less system resources.

Figure 3:
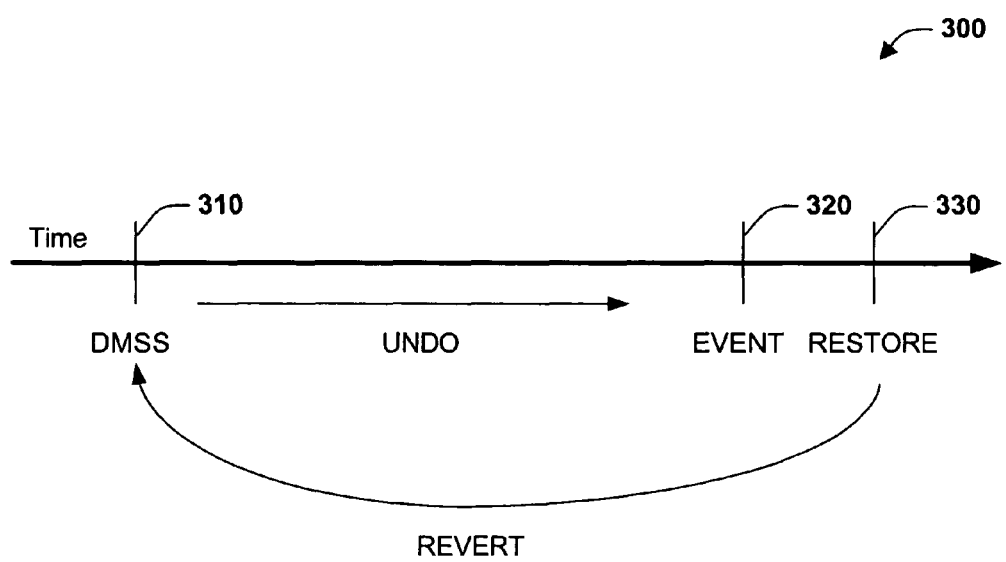
FIG. 3 illustrates a timeline diagram to illustrate various aspects of the subject invention.

Turning to FIG. 3, a timeline 300 is illustrated to further provide clarity concerning the database restoration operations according to aspects of the invention. Time advances from left to right on the timeline 300. In other words, events positioned farther to the right occur later in time than those further to the left. At 310, the database snapshot (DBSS) is created. A period of time passes (minutes, hours, days . . . ) and an event occurs at 320. For example, the event can correspond to a user accidentally deleting a complete table or otherwise modifying page data. Thereafter, a restore operation can be initiated by a database administrator, for instance. Consequently, the revert component 210 (FIG. 2) of the subject invention can be employed to restore the database to the point in time 310 in which the database snapshot was created. According to an aspect of the subject invention, this can be accomplished by copying sparse file data from the snapshot database over the corresponding data in the source database thereby placing the source database in a consistent stable state devoid of the effects of the event at 320. The undo component 220 (FIG. 2) can then be employed to advance the source database toward the event 320 so as to maintain "good" data while losing or altering data caused by the event. This can be accomplished by applying open transactions stored in an undo file to the restored database and/or database log files.

Figure 4:
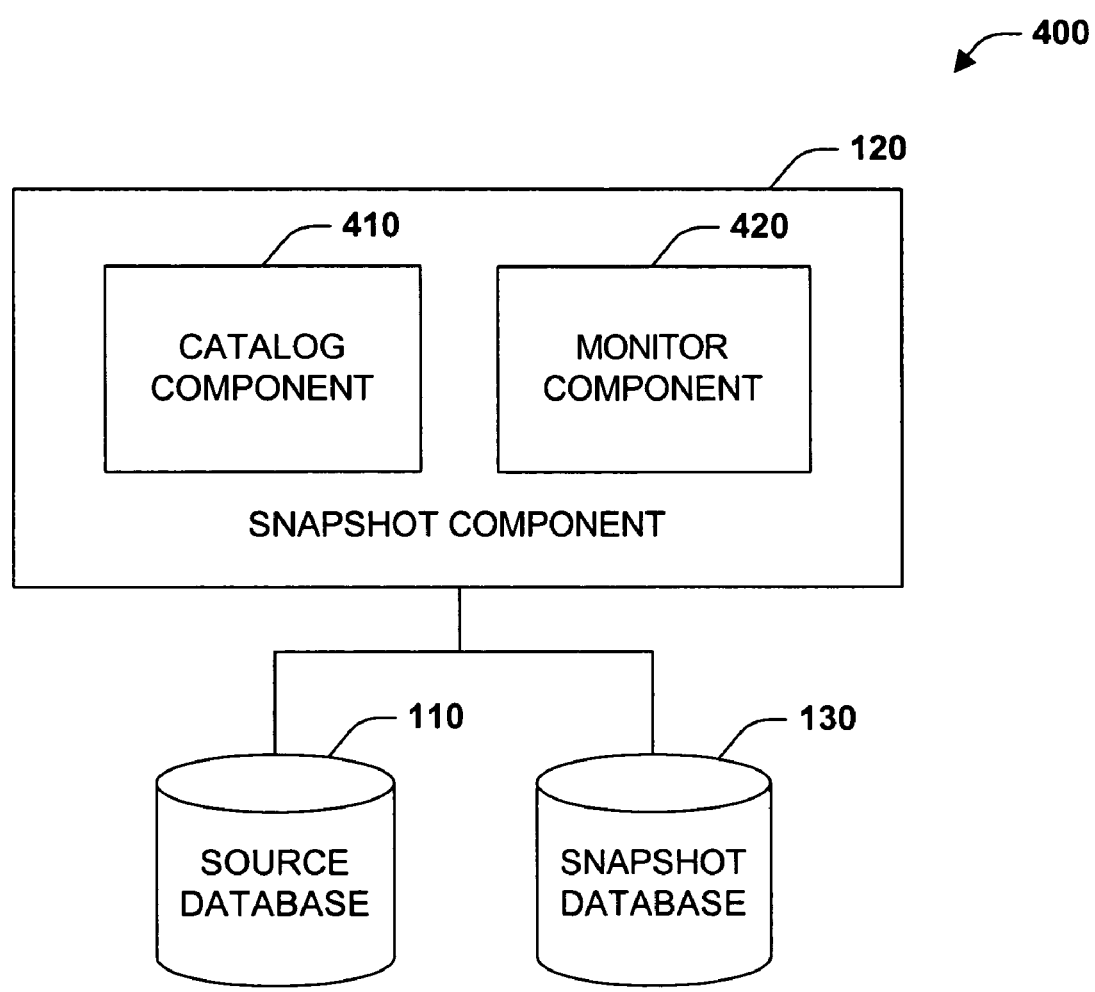
FIG. 4 is a schematic block diagram of a database snapshot system in accordance with an aspect of the subject invention.

FIG. 4 illustrates a database snapshot system 400 in accordance with an aspect of the subject invention. The DBSS system 400 comprises a snapshot component 120, a source database 110, a snapshot database 130, a catalog component 410, and a monitor component 420. The source database 110 as previously mentioned is the main or primary database, which one may seek to restore. The snapshot component 120 utilizes the source database 110 to generate a database snapshot 130. A database snapshot (DBSS) 130 can be a read only, point in time database. It is space efficient because it shares space with the source database 130. The shared space is all the data pages that are identical in the two databases. According to one exemplary implementation, the DBSS can be created with the following syntax:

```
CREATE DATABASE ss_database_name
ON < filespec > [ , ...n ]
AS SNAPSHOT OF source_database_name
```

For every data file in the source database 110, another file for the DBSS 130 is created. These new files are sparse files. When pages are changed in the source database 110, they are first copied to the sparse files. A catalog component 410 can be employed to generate a log or log file to track whether a page in the DBSS 130 is shared with the source database 110, or the page has been copied to the sparse file. According to one aspect of the invention log is stored in the source database 110 to facilitate easy access thereto.

It should be appreciated that recovery can be run on the DBSS 130 before it is available to be read, to bring it into a consistent state. Current open transactions are rolled back, and some of the original pages will probably be copied over to the sparse files because of the rollback. According to an aspect of the invention, a DBSS has no log. Once created, a DBSS 130 can remain in existence until it is dropped by the database administrator if it is persisted otherwise it can be dropped upon error or system shut down.

Multiple DBSSs 130 may exist at different points in time for a single source database 110. According to one aspect of the present invention, all snapshots besides the one being reverted or restored can be destroyed. Alternatively, all snapshots residing later in time than the snapshot being reverted to can be destroyed, while those occurring earlier in time can be saved. Snapshots of a source database taken after a snapshot that is or is going to be reverted to are not very valuable. Furthermore, new snapshots can be taken of the source after it has been restored utilizing a database snapshot, for instance. Snapshots taken before the snapshot used for a restore are much more valuable as one could still revert back to the particular point in time captured by the prior snapshot.

DBSS 130 can be created and dropped in a periodic manner, or ad hoc if the user wants a single "safe" point in time to enable reversion thereto. For example, a user may want to create a snapshot upon installation of a new application or during testing. A revert to DBSS 130 could be issued utilizing the following command:

```
RESTORE DATABASE { database_name |
@database_name_var } FROM
DATABASE_SNAPSHOT=<snapshotname>
```

Monitor component 420 can be also be utilized by the snapshot component 120 to observe transactions with respect to the source database and initiate automatic generation of database snapshots. For example, if the monitor component 420 detects or in infers installation of a new application that may significantly alter the source database it can commence creation of a database snapshot. To facilitate such functionality, it should be appreciated that the subject invention can employ artificial intelligence systems and methodologies including but not limited to rule-based expert systems, Bayesian, and neural networks.

To restore a database, the source database is closed, and all connections to it are closed. Consequently, the source is unavailable for transactions during this process. The database can be marked as RESTORE to notify external viewers of the unavailability of the database. A server can then proceed to copy the pages in the sparse files to the original position (when the DBSS was created) in the source database files. Copying the changed pages in most instances is significantly faster than restoring from backup. Once the pages are copied, the log for the database can be rebuilt. The source database is now back at a point in time it was at when the DBSS was created. All changes since the DBSS was created have been removed. If an UNDO file is created, then the log chain is not broken, and a data log backups taken from the source database can be applied to roll the source database forward.

The scheme to support roll forward after the revert using an undo file can be summarized as follows. On the creation of the DBSS, the original value of every page touched by the recovery of the DBSS when it is created can be saved as a "pre-image" in a separate undo file. On the revert, DBSS pages can be copied to the source database as described. The pre-images can be copied from the separate UNDO file. At this point, the database is exactly as it was when the DBSS was created. Thereafter, database logs can be employed to roll forward the reverted DBSS to a point in time just before the user error occurred, so as to minimize the amount of data lost.

Figure 5:
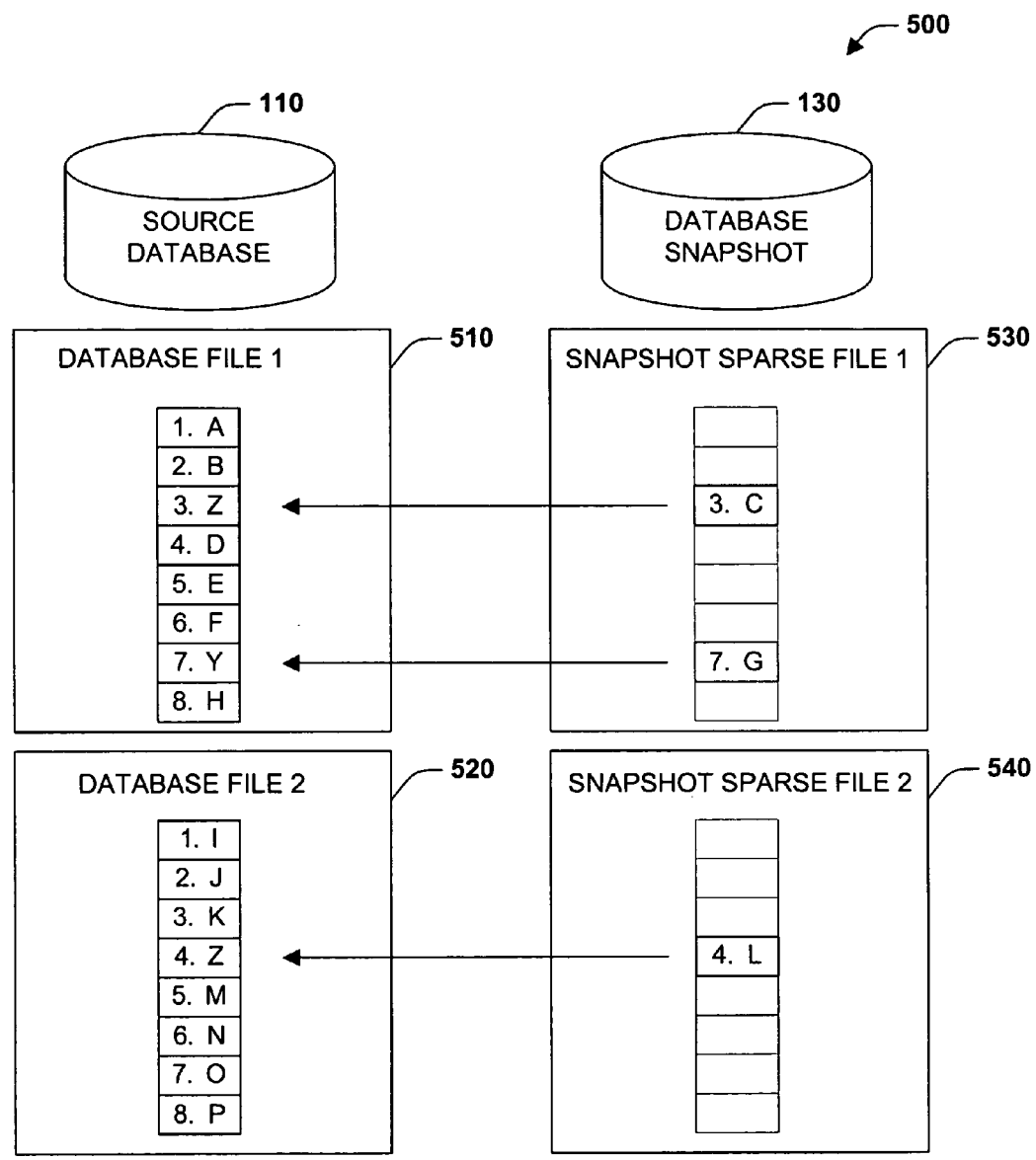
FIG. 5 is a diagram illustrating an exemplary database restore in accordance with an aspect of the present invention.

Turning to FIG. 5, a diagram is provided to illustrate an exemplary database restore 500 in accordance with an aspect of the subject invention. Source database 110 includes two database files 510 and 520. Database files 510 and 520 both contain eight pages each of various data. A snapshot of the source database is generated. Accordingly, database snapshot 130 is created. The snapshot database can have two snapshot database sparse files 530 and 540 corresponding to source files 510 and 520 respectively. At the time the snapshot originates, these database sparse files can simply be shells as they can share all data with source files 510 and 520. At some point after creation of the snapshot, values in the source database can be altered. Here, the values changed reside on pages 3 and 7 in file 510 and file 2 on page 4. Specifically page 3 has been changed from "C" to "Z," page 7 has been changed from "G" to "Y," and page 4 has been changed from "L" to "Z." Accordingly, the original values prior to the change have been saved to the sparse files 530 and 540, here "C," "G," and "L." On a restore, the pages in the sparse file, here 3 and 7 from file 530 and page 3 from file 540 can be copied back over the updated pages in the source or primary database 110.

Copying the pages comprises several scenarios including simply copying the modified pages back, or more complex ones like adding or deleting files, growing or shrinking the primary database files to the size of the sparse files, adding or deleting the pages (i.e. keeping track of the pages added to the primary so that they can be removed while restoring) etc. For the file additions and deletions, one can compare the file lists of both the source database and the database snapshot and synchronize them. For page additions, if the source is bigger then the snapshot or replica, the source can be chopped off or truncated at the end to the size of the replica, in part because pages that were added, were added at the end of the source according to an aspect of the invention. If the replica is bigger, this means pages were deleted from the primary source. Hence, the size of the source can be increased and all the pages for that range will already be in the snapshot and thus will be copied over by the normal copy operation.

One naïve algorithm to copy the pages back would be copy them one by one. However, according to an aspect of the invention an asynchronous copy operation implementation can be employed. For instance, a single thread and three queues, a read queue, a write queue, and an empty buffer queue, can be utilized. While copying back, if the page was there in the source (e.g., meaning it changed) or it was not there (e.g., meaning it was deleted) it can simply be copied to the source. If however, there are extra pages in the primary source, then they would have been added at the end of the file, which can be remedied by truncating the file to the size of the replica. Finally, the source can be unlocked to complete the restore.

According to another aspect of the invention, the log backup associated with a source database can be broken after a restore. Hence, log backups will fail on the reverted database until a full or file backup is taken. The reverted database can retain the same recovery model as it did when it was created. Hence, the system of the present invention can support (1) starting the revert; (2) manipulating data; (3) rebuilding the log; and (4) restarting the database.

According to yet another aspect of the invention, a new source database can be created from the snapshot database by copying the data from the original source database. Any error during the database creation may require a database administrator (DBA) to restart the operation, for example, once the server becomes available. Once the database is created, the DBA can drop the source database and rename the reverted database. Such a system can be employed with respect to data mirroring for example.

Figure 6:
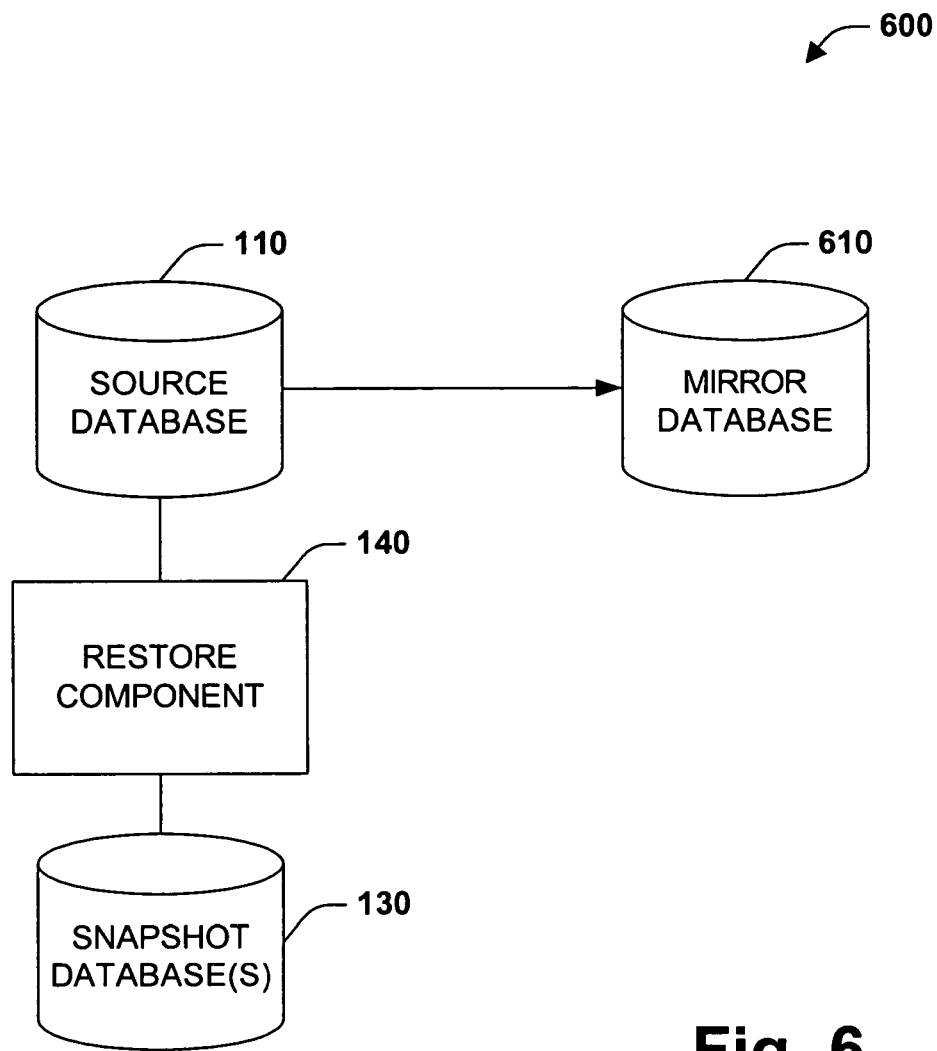
FIG. 6 is a schematic block diagram of an exemplary database mirroring system in accordance with an aspect of the subject invention.

Turning to FIG. 6, an exemplary data mirroring system 600 is illustrated in accordance with an aspect of the subject invention. System 600 comprises two databases: source database 110 and mirror database 610, database snapshot(s) 130 and restore component 140. Source database 110 is the primary database. Mirror database 610 is a separate database comprising almost a bit for bit replica of the source database 110. Thus, as changes are being made to source database 110 they can be sent over a network, for instance, to mirror database 610. The idea behind mirroring is that if the primary source database 110 fails or otherwise becomes unavailable, for instance due to a power failure, mirror database 610 can become the new source database for transactions thereby facilitating high availability of data via redundancy. According to an aspect of the present invention previously described, the source database 610 can have snapshot database snapshot (s) 130 associated therewith to facilitate point-in-time reversion. Thus, a database administrator could revert the source database 110 to a previous point in time utilizing database snapshot 130 and restore component 140. If a revert is performed on the source database 110, the mirror database 610 should also reflect the changes. Conventionally, a time consuming backup and full restore was needed to update and resynchronize the mirror database 610. According to an aspect of the invention, the mirror database 610 can automatically be updated and synchronized with the source. Since the changes to the source are automatically reflected in the mirror database changes to the source during the revert can also be passed to the mirror simultaneously or asynchronously after the revert has been completed on the source.

Figure 7:
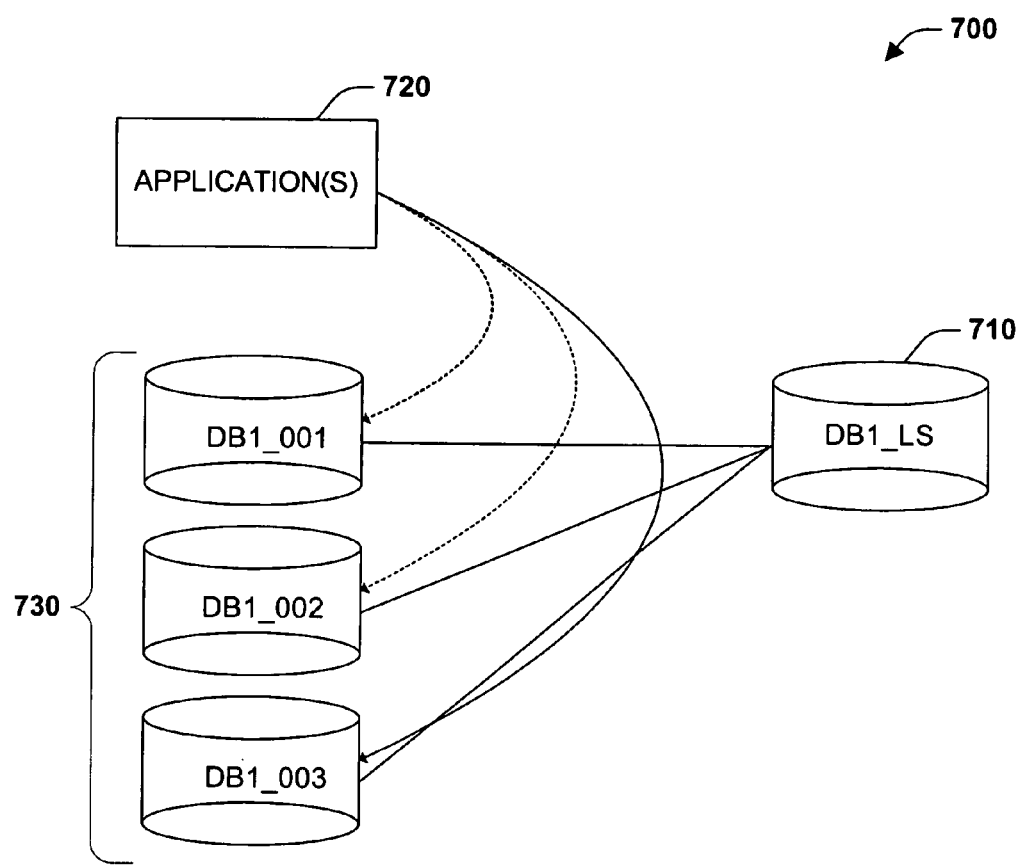
FIG. 7 is a schematic block diagram of an exemplary mirroring system in accordance with an aspect of the present invention.

Turning to FIG. 7, an exemplary system 700 for mirroring a database with snapshots is illustrated in accordance with an aspect of the subject invention. As shown the system 700 includes a base or destination database 610 named DB1_LS. Applications 620 seek to view data from database 610. In particular, applications 620 can interact with snapshots 630 named DB1__001, DB1__002, and DB1__003. The first snapshot DB1__001 can be created and referenced to DB1, for example:

---
CREATE DATABASE DB1__001 AS SNAPSHOT OF DB1_LS
ON (NAME = 'datafile', FILENAME = 'F:\DB1__001.SNP')
---

Subsequently, the second snapshot DB1__002 can be created. Users who are still using DB1__001 continue to use it:

---
CREATE DATABASE DB1__002 AS SNAPSHOT OF DB1_LS
ON (NAME = 'datafile', FILENAME = 'F:\DB1__002.SNP')
---

Thereafter, the third snapshot can be created and make reference to DB1. Users who are still using DB1__001 or DB1__002 continue to use them:

---
CREATE DATABASE DB1__003 AS SNAPSHOT OF DB1_LS
ON (NAME = 'datafile', FILENAME = 'F:\DB1__003.SNP')
---

Additionally, according to an aspect of the subject invention database snapshots can be utilized for consistency checks on a database. For example, a DBCC CHECKDB( ) command can be executed on a database. As a consequence, an internal snapshot of the database with the backing storage can be created in alternate streams of existing database files. The pages can then be read for the consistency check and the system can either read them from the base database if they have not been modified or from alternative streams if they have been modified.

It should also be appreciated that although not illustrated the subject invention can employ one or more graphical user interfaces (GUIs). The GUIs can be utilized to support management of snapshots. For example, a plurality of text and graphical components including but not limited to text boxes, buttons, tabs, drop-down menus, and scroll bars can be employed to create a snapshot and subsequently revert a database back thereto.

Furthermore, both the database snapshot and the source database associated therewith can be backed up in a conventional sense. For instance, an administrator may backup individual files or filegroups from the snapshot. When the backups are restored, they are restored as regular databases. On a backup operation of the source, the user can specify which snapshots are to be taken with the backup. On restore, the user can specify which snapshots are to be restored as well.

Database Snapshots (also known as Copy-On-Write Databases)

Figure 8:
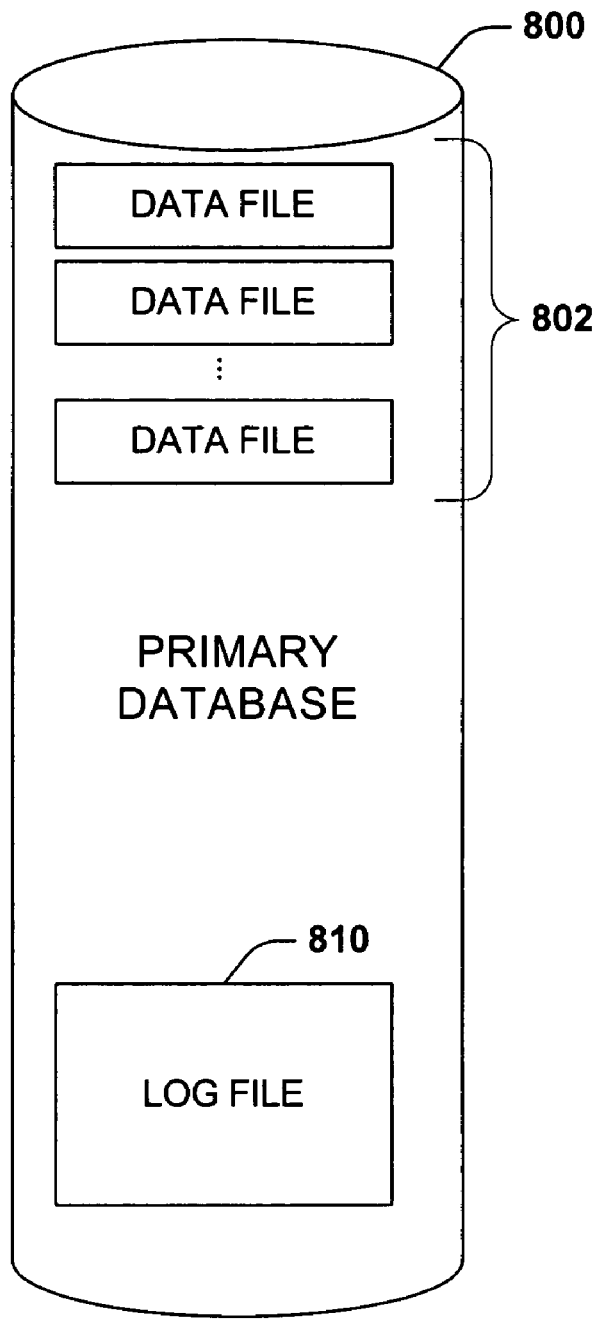
FIG. 8 is a schematic block diagram of a primary database in accordance with an aspect of the subject invention.

Generally, a database consists of files of two types: data files and log files. Log files contain a series of log records. Log records may be identified with a log sequence number (LSN). As depicted in FIG. 8, according to one aspect of the invention, the primary database 800 includes of a set of data files 802 and a log file 810. Data files 802 can be divided into blocks or units of storage called pages.

A database snapshot for a database can be created which provides a transaction consistent view of an existing database at a previous point in time without creating a complete copy of the database. A database snapshot, in conjunction with the database, includes all the information necessary to produce a copy of the database at the previous time. The database snapshot, however, does not in itself contain all of the information and thus can be smaller in size than a full copy would be. Additionally, a snapshot can be created on the fly as modifications are made to the database, which allows the costs (time and processing) to be spread over time. If a copy was made of the database snapshot at the prior time, the time and processing cost would be concentrated at one time. Additionally, database snapshots are advantageous in that they can be created while update activity continues on the database. The primary database is the database which is being used and of which one or more database snapshots are being created.

As described supra, a database snapshot contains all the information needed to, along with the primary database, determine the contents of the primary database at a previous time. The database snapshot can comprise a side file corresponding to each file in the primary database. A side file contains a copy of all data from the corresponding data file, which has been changed since the database snapshot was created. In one aspect of the present invention, in order to avoid the need for a mapping table from pages in the side file to pages in the primary file, the side files are stored in sparse files. In a sparse file, only portions of the file that are actually written to need storage space. All other regions of the file can be unallocated. It should be noted, however, that storing side files in sparse files is not a requirement of the present invention and alternative storage systems and methodologies are considered to be within the scope of the invention.

According to another aspect of the invention, the sparse file mechanism works with a standard region size. If data within one region is written to the sparse file, even if the data does not fill the entire region, space for the entire region can be allocated. Because this space is allocated and can be read from, a distinction can be made between the areas of the region filled with valid data and the areas of the region, which exist because the granularity of the sparse file requires a region of a certain size to be allocated if any storage within that region is necessitated.

Because the database snapshot includes the original value of all of the data, which has been changed in the primary database since the database snapshot was created, the database data as of the time of the creation of the database snapshot may be read from the snapshot. In order to respond to a request for data from the database snapshot, data can be read from the database snapshot's side files, if the side files contain the data from the request. The data to be read which is not present in the side files has not been changed since the database snapshot was created and can be read from the primary database.

According to yet another aspect of the invention, the side files comprise pages of data from the primary database. When any data on any page of the primary database is changed, the page of data is stored in a side file. The present invention is described with reference to pages as the unit of data in the primary database; however, it is contemplated that other units of data from the primary database may be utilized.

In order to determine which data has been written to the side file and which data should be read to the primary database, the presence of valid data in the side file should be ascertained. In one instance, it can be read directly to ascertain if valid data exists. According to another aspect of the invention, a side page table can be created which stores data regarding whether a given page exists and is valid.

For each page in the primary database, the side page table can store information regarding whether the page should be read from the primary database, indicating that it has not changed, or whether the page should be read from a side file, because it has changed. The side page table allows a fast determination of whether a given page exists in the side file.

According to another aspect of the invention, the side file and the sparse file mechanism both use the same page/region size. That is, the pages that the side file stores from the primary database are the same size as the regions, which the sparse file stores when any memory is written into the sparse file. For example, if the sparse file regions are 8 KB and the pages stored from the primary database are also 8 KB, the page size and the region size are equal. In this case, any region that is filled will be filled completely by the page read from the primary database, and there is no possibility that invalid data is stored in the region.

In accordance with another aspect of the invention, a number of side file regions can correspond exactly to each page. For example, if the sparse file regions are 8 KB (kilobytes) and the pages stored from the primary database are 16 KB, then each page stored in the side file will fill two regions. In this case, as well, any region that is filled will be filled completely by contents from the page read from the primary database. Again, there is no possibility that invalid data is contained in the region.

For these aspects of the invention, the side page table comprises an in-memory bitmap, which holds one bit of information for each page in the side file. For each page in the side file, the corresponding bit indicates whether the page is in the side file.

According to another aspect of the invention, the granularity of the side file region is larger than the granularity of the pages stored from the primary database. For example, if each region of the side file is 64 KB and the size of the pages is 8 KB, then the presence of a region in the side file does not necessarily indicate that all information in the region is valid data from the primary database. If only one page is copied to the side file, in the example, only 8 KB of the 64 KB in the allocated region will contain valid data. In another embodiment, some side file pages are spread across regions.

For these aspects, the side page table comprises two in-memory bitmaps, which hold two bits of information for each page in the side file, which we will term bit1 and bit2. For each page in the side file, the corresponding bits indicate (bit1) whether the page is definitely in the side file, and (bit2) whether the page is potentially in the side file. Bit2 may also be thought of as indicating that the region in which the page would be stored in the side file has been allocated. However, as discussed below, in one embodiment, this bit2 is set only when the side page table is reconstructed.

The bitmaps are maintained in-memory and therefore may not be persistent. If they are erased, the bitmaps are reconstructed from the sparse file information. The sparse file is consulted, and, for each page, if the side file has allocated space for the region in which the page is located, bit2 is set to indicate that the page is potentially in the side file. For each page, bit1 is initially set to indicate that it is not definite that the page is in the side file.

If the side page table is maintained in such a way that it is persistent, then the granularity of the regions and the pages may be disregarded, and the one-bit side page table may be used. However, in one embodiment, in order to support a persistent database view after a database server restart, the two-bit page table is used.

In accordance with one aspect of the invention, no page table is created for the side files. In this case, whenever it is necessary to determine whether a copy has been made of a page in the database snapshot, the database snapshot is consulted. The invention will be described below with reference to an aspect of the invention in which a one-bit or a two-bit page table exists, however, other embodiments of the invention in which there is no page table, and the database view must be examined to determine whether it contains a page copied from the primary database are also contemplated.

Figure 9:
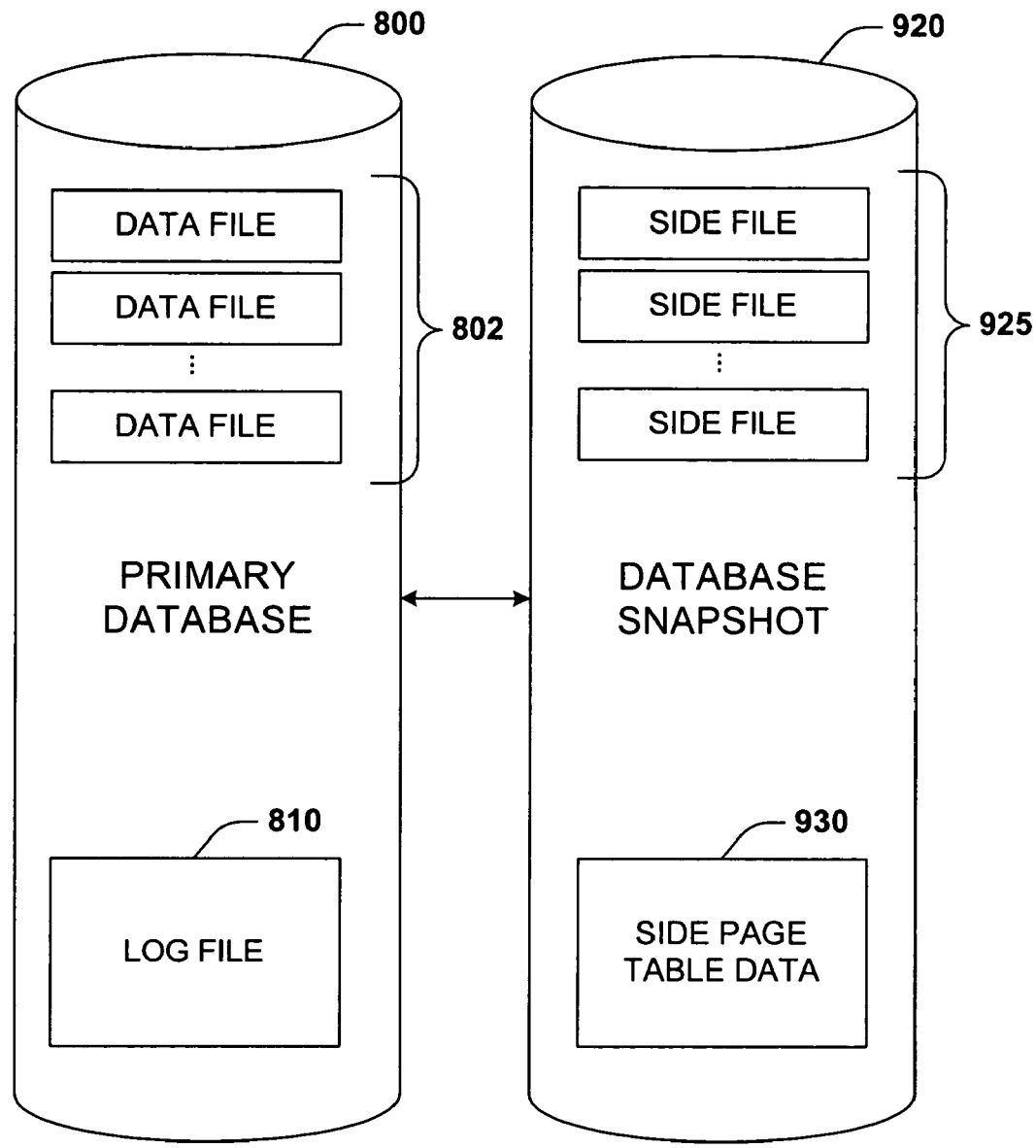
FIG. 9 is a schematic block diagram of a database snapshot system in accordance with an aspect of the present invention.

As shown in FIG. 9, the database snapshot 920 for primary database 800 consists of side files 925. Each of the data files 802 in primary database 800 has a corresponding side file 925 in the database snapshot 920. Additionally, side page table data 930 is stored in-memory for the database snapshot 920. According to one aspect of the invention, side page table data 930 is one side page table, which covers all of the side files 925. According to another aspect of the invention, a separate side page table can exist for each of side files 925.

In a database, the transaction log is a serial record of all the transactions that have been performed against the database since the transaction log was last backed up. The transaction log is used to recover the database to a point of failure. According to one aspect of the invention, the transaction log is modeled as a circular queue. A transaction log may be truncated by deleting an inactive portion of the log. This inactive portion contains completed transactions which do not need to be recovered at least because the changes they reflect have been persisted to the data files. Conversely, the active portion of the transaction log contains both completed transactions and transactions that are still running and have not yet completed (active transactions.) Truncation can be done to minimize inactive space in the transaction log instead of allowing the transaction log to continue to grow and use more space.

Active transactions may cause transaction-inconsistency. For an active transaction, some modifications of data files may not have been written from the buffer cache to the data files, and there may be some modifications from incomplete transactions in the data files. The log file 810 can be used to ensure that a recovery of the database is transaction consistent. This can be done using ARIES (Algorithms for Recovery and Isolation Exploiting Semantics)-style recovery. Every modification recorded in the log which may not have been written to the data files is rolled forward by performing the modification on the database. To ensure the integrity of the database, every incomplete transaction found in the transaction log is rolled back by undoing the modification on the database.

In order to create a database snapshot, the physical structures (the side files and page tables) of the database view must be initialized. First, a side file 925 is created for each data file 802 in the primary database 800. As discussed above, a side file may be a sparse file or in another embodiment may be a non-sparse file of the same size as the data file 802. Side file 925s are associated with the data files 802 in the primary database 800.

Because transactions are continuously occurring and the database view is transaction consistent, the transaction log should be used during the creation of a database snapshot. In order to ensure that information regarding transactions that should be used for the database view is not discarded, log truncation (if it exists) is disabled on the primary database 800.

According to an aspect of the invention, a side page table 930 is initialized for the database snapshot. Initially, the side page table 930 is set to indicate that no pages exist in side file 925, and, in the case of a two-bit side page table, that no pages are potentially or definitely in side file 925.

When the initialization is completed, the database snapshot is ready to go "online". The database snapshot will now be running alongside the primary database 800, and when modifications are performed, copies of the original values of the modified pages (i.e. the pages' contents before the updates are performed) will be stored in the database snapshot. An exemplary method for implementing a transaction-consistent snapshot of a database can include determining a split point on the transaction log. This split will correspond to the point in time that the database snapshot represents. The LSN of the end of the log on the primary database 800 can be obtained when the database snapshot is created; this LSN is the "split point" at which the primary database 800 and the database snapshot 820 will start diverging. The primary database 800 can then be marked so that database snapshot processing is required. Database snapshot support in the primary database 800 as described below, begins.

In order for the database snapshot to be consistent, the log of the primary database 800 prior to the split point must be analyzed to determine what transactions were active at the time of the split. The oldest active (as of the split point) transaction in the log is identified. Log truncation is enabled before that oldest active transaction.

Figure 10:
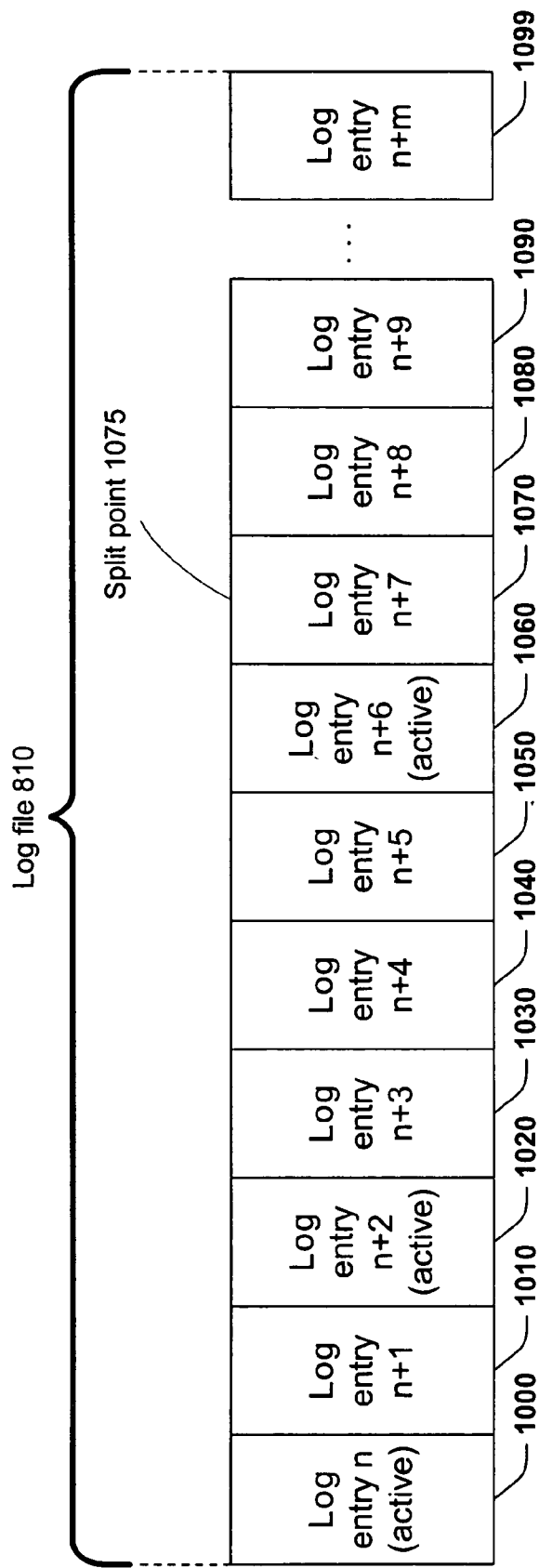
FIG. 10 is a schematic block diagram of an exemplary transaction log in accordance with an aspect of the subject invention.

In a manner similar to ARIES (Algorithms for Recovery and Isolation Exploiting Semantics)-style recovery, all the operations in the log of the primary database 800 from the oldest active transaction prior to the split point are performed to the database snapshot. FIG. 10 is a block diagram of an example transaction log, log file 810, according to an aspect of the invention. Log entries in log file 810 include log entries 1000, 1010, 1020, 1030, 1040, 1050, 1060, 1080, 1080, 1090 and 1099. A split point 1075 is determined. Transactions continue being written to the log however, truncation is disabled. The log file 810 is examined, and any modifications to the database as a result of transactions from the oldest active transaction to the split point (from log entry n 1000 through log entry n+7, in the example in FIG. 10) are performed to the side files 925. The result of the modifications in each of these transactions is stored in the side files 925. Then, these transactions are examined. Modifications written to the log file by any active transactions in the log, such as log entry n 1000, log entry n+2 1020, and log entry n+6, are undone in the side files 925.

Some transactions, however, may not yet have been committed. Therefore, active transactions in the log up to the split point should be located and undone. According to an aspect of the invention, where an incomplete transaction changes the value for a certain location in the database, the change, which has been added to the side file above, is removed from the side file. Alternatively, the undoing of a transaction can be accomplished by modifying the database snapshot, as detailed below, setting the data in the side file to match the data in the database as of the split point.

In this way, only the completed transactions from the log are reflected in the database snapshot. When the transactions on the log are reflected in the database snapshot, with the exception of transactions active when the split point occurred which have been undone, log truncation is enabled on the primary database 800. Because database snapshot processing has been enabled, the database snapshot will be updated as changes are made to the primary database 800, and so the database snapshot can be used to determine the contents of the primary database 800 as of the time of the split point.

When a database server restarts after it is shut down (either normally or abnormally), the database snapshot should be reinitialized. In order to do so, the side page tables, which have been stored in memory, must be reinitialized.

In order to reinitialize the side page table, in a two-bit side page table implementation, for each region in the side page table that has been allocated, the data (bit2) in the side page table for each page in a region that has been allocated is set to indicate that the page may possibly have been written to side file 925. The data in the side page table for all other pages is set to indicate that there is no possibility that the page was written to side file 925. It is not definite, however, that the page was written to side file 925, and therefore bit1 is not set initially.

Alternatively, either in the two-bit side page table implementation or in the one-bit side page table implementation, side file 925s may be examined to determine, for each page, if the page in side file 925 is valid, as described supra. The page table is set to indicate, for each page which does exist, that the page does actually exist in side file 925. All other pages are set to indicate that the page does not exist in side file 925.

In order for the database snapshot to store information from the primary database 800 before the data is overwritten, the primary database 800 must support the creation of a database snapshot. For each page that the primary database 800 modifies, a determination must be made as to whether the page is in the database snapshot. If the page exists in the database snapshot, then it is the correct version of the page. For example, this may have been when a previous modification had been made to that page in the primary database 800. If the page is changed again in the primary database 800, the version in the database view should not change.

When the information is received from the primary database 800 that a page has being changed, if the page is in side file 925, nothing should be done. If the page is not in side file 925, the page should be written to side file 925, and the correct bit should be set in the side page table. In the case where there is a two-bit page table, there are three possibilities for bit1 and bit2 for the page, as indicated by the following Table 1:

TABLE 1

Cases for Two-Bit Page Table

|  | Bit1 indicates that the page is definitely in the side file | Bit1 does not indicate that the page is definitely in the side file |
|---|---|---|
| Bit2 indicates that the page is possibly in the side file | Case 1: page is in the side file | Case 2: page is possibly in the side file |
| Bit2 indicates that the page is definitely not in the side file | Case 1: page is in the side file [alternately: Case 4: invalid] | Case 3: page is definitely not in the side file |

According to an aspect of the invention, when bit1 indicates that the page is definitely in side file 925, bit2 is ignored; thus, as shown in Table 1, where bit1 indicates that the page is definitely in side file 925, the page is assumed to be in side file 925 no matter what bit2 indicates. In an alternate embodiment, when bit1 is set to indicate that the page is definitely in side file 925, bit2 is set to indicate that the page is possibly in side file 925, and in this alternate embodiment, when bit1 indicates that the page is definitely in side file 925 yet bit2 indicates that the page is definitely not in side file 925, the case is invalid and an error has been encountered.

When the primary database 800 indicates that a page is being changed, for a two-bit page table, the actions which should be taken for the cases listed above are as follows:

Case 1: Do nothing.

Case 2: Determine if the page is in side file 225, if it is not, write the page to side file 225.

Case 3: Write the page to side file 925.

When the page is written to side file 925, in either Case 1 or Case 2 the old version of the page in the primary database 800 (the version now being modified by the primary database 800) is written to side file 925. Additionally, the page table is set to indicate that the page is now in side file 925 so that any subsequent writes to the page will be handled according to Case 1, and the correct page for the database view remains stored in side file 925.

In order to determine if the page is in side file 925 in Case 2, data corresponding to the page is read from side file 925. If the data is valid then a previous version of the page is in side file 925, then it should not be overwritten. In one embodiment, the page table bit1 corresponding to the page is set to indicate that the page is definitely in side file 925, so future writes to the page are handled under Case 1.

Data invalidity may be indicated by data placed in newly allocated regions to indicate that no valid data has yet been written to the region. For example, all zeros may be written to a newly allocated region, if it is known that no page of the database will ever contain all zeros. If this is the case, then the presence of the page in side file 925 is indicated by the corresponding page in side file 925 being part of an allocated region and containing some non-zero data.

The cases detailed in Table 1 are also useful for performing a read of data stored in a database snapshot. When data in a page is being read from a database view, the page should be read from side file 925 if it exists in side file 925. If it does not, the page should be read from the primary database 800. In a two-bit page table system, the actions that should be taken for the three cases are as follows:

Case 1: Read the page from side file 925.

Case 2: Determine if the page is in side file 925, if it is, read the page from side file 925, if it is not, read the page from the primary database 800.

Case 3: Read the page from the primary database 800.

The database snapshot represents the state of a database at a prior point in time. A user may choose to use the database snapshot as a database. For example, the user may choose to perform an action on the database snapshot, to create a database snapshot of the database as it would have been had the action been performed on the database snapshot at the prior point in time. Additionally, during initialization, as detailed above, transactions may be performed and undone on the database snapshot.

To modify the database snapshot, the modification should be based on the data in the database snapshot and the resulting page should be stored in the database snapshot. If no data exists in the database snapshot for the page, then the modification should be based on the data in the primary database 800, and the resulting page should be stored in the database snapshot.

In a two-bit page table system, the actions that should be taken for the three cases are as follows:

Case 1: Read the page from side file 925, perform modifications, write the page to side file 925.

Case 2: Determine if the page is in side file 925, if it is, proceed as in case 1, if it is not, proceed as in case 3.

Case 3: Read the page from the primary database 800, write the page to side file 925 and set the page table to indicate that the page is in side file 925. Perform modifications to the page and write the modified page to side file 925 when appropriate.

Figure 11:
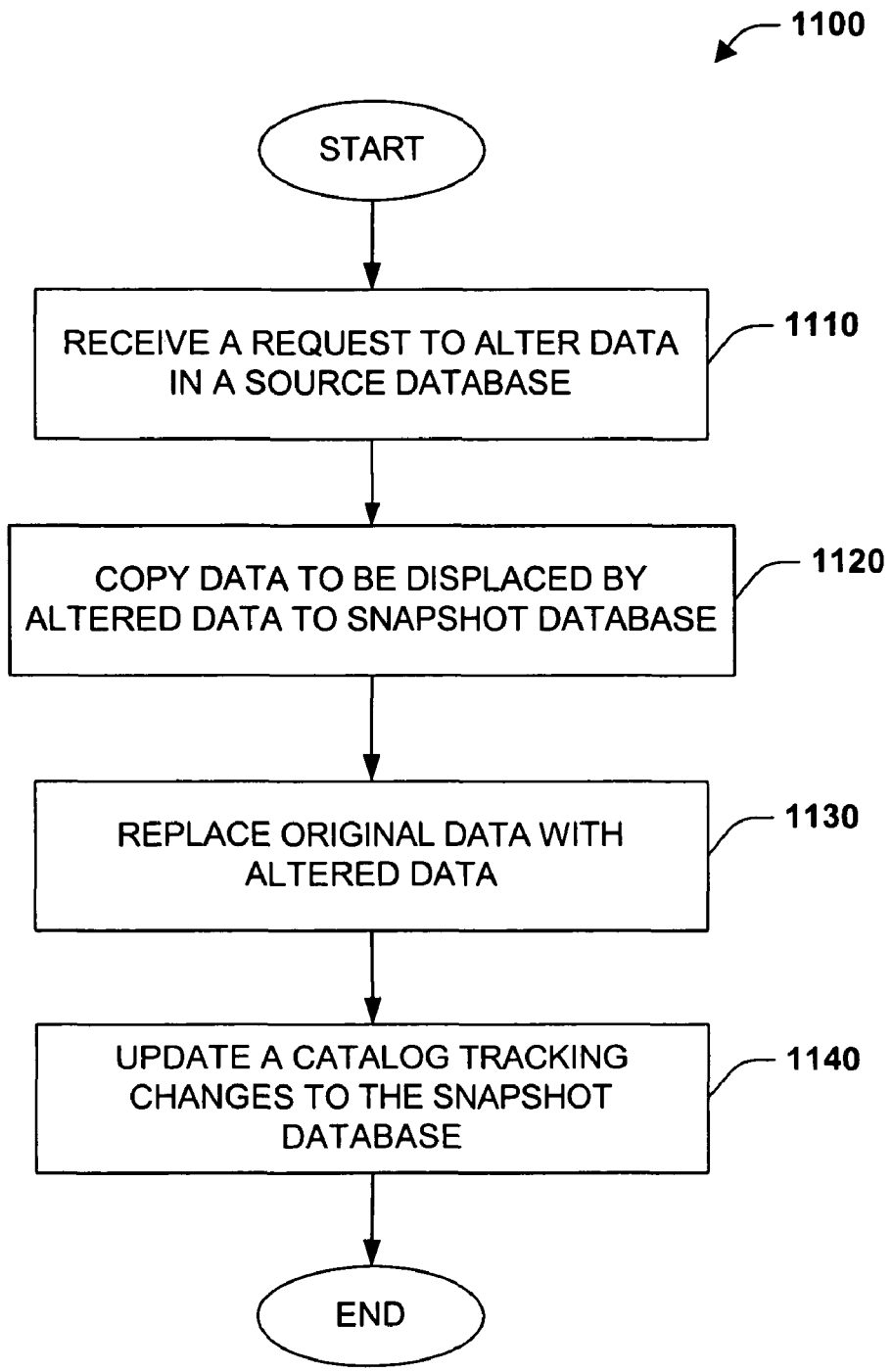
FIG. 11 is a flow chart diagram depicting a method of establishing a snapshot database in accordance with an aspect of the subject invention.
Figure 12:
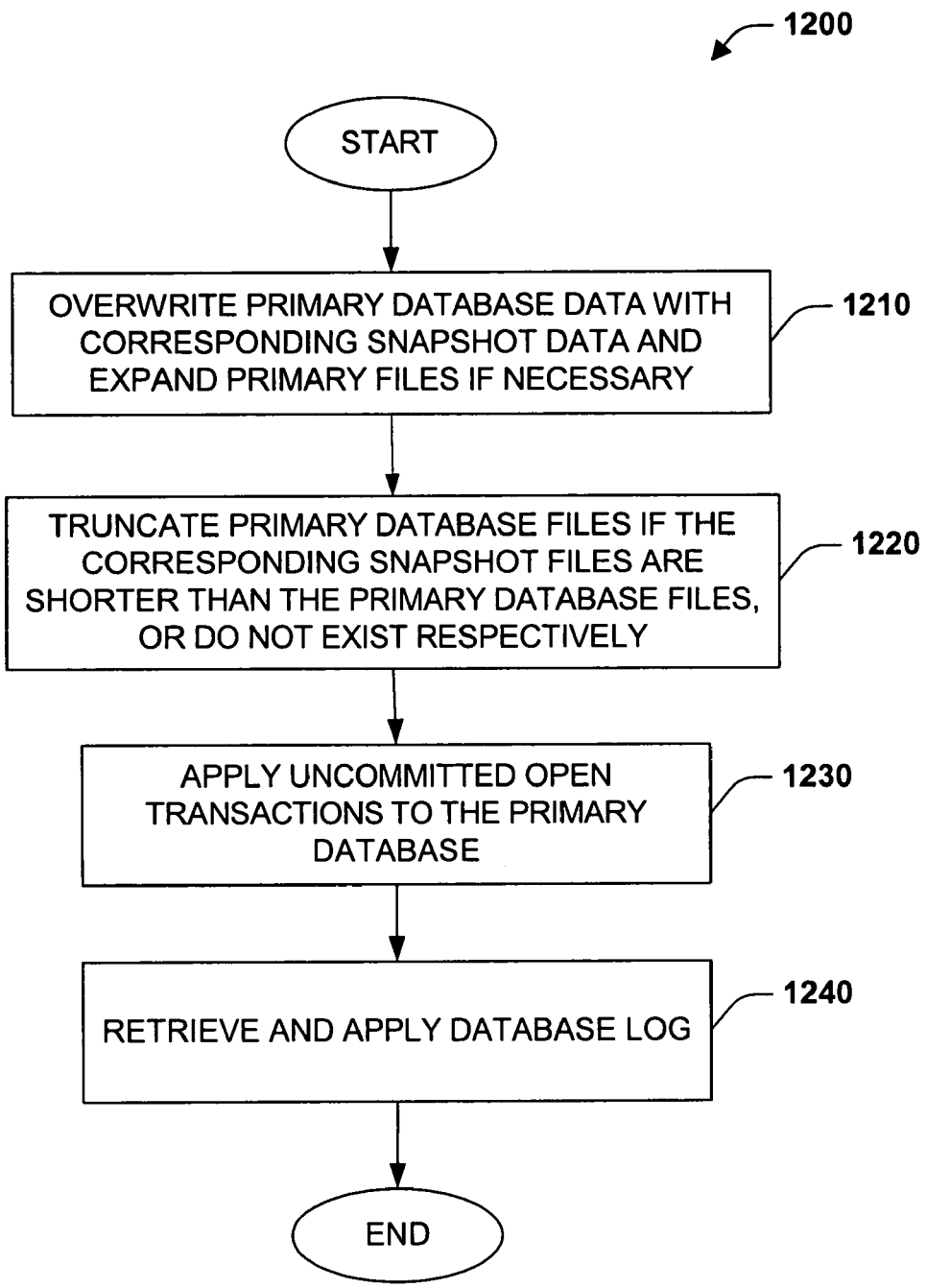
FIG. 12 is a flow chart diagram illustrating a restoration methodology in accordance with an aspect of the present invention.
Figure 13:
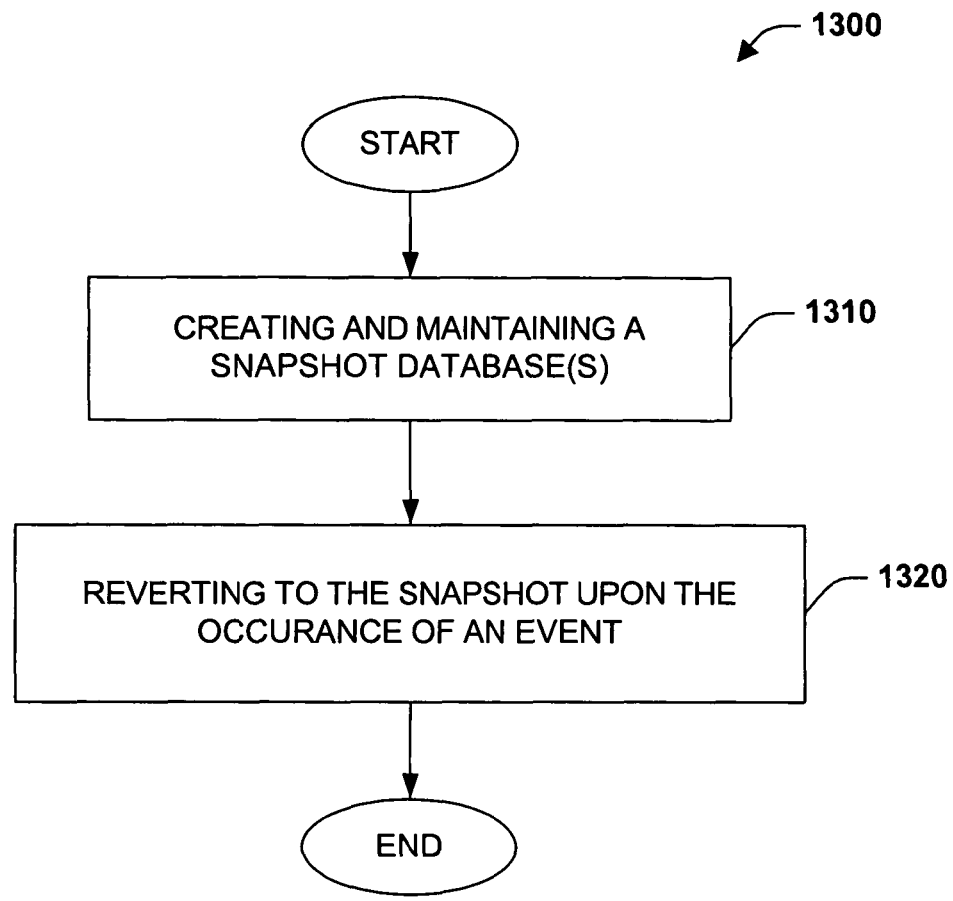
FIG. 13 is a flow chart diagram of a data restoration methodology in accordance with an aspect of the subject invention.

In view of the exemplary system(s) described supra, a methodology that may be implemented in accordance with the present invention will be better appreciated with reference to the flow charts of FIGS. 11-13. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media. By way of illustration and not limitation, the article of manufacture can embody computer readable instructions, data structures, schemas, program modules, and the like.

FIG. 11 depicts a method for establishing a snapshot database 1100 in accordance with an aspect of the subject invention. A snapshot database maintains data concerning changes to a source database from the point of time of its creation. At 1110, a request is received to alter data in the source or primary database. For example, a request may be made to change or alter a page of data. At 1120, a copy of the data in the source database to be displaced by the new data is copied to the snapshot database file and page corresponding to the amendment of the source database. At 1130, the new data is copied over or replaced by the old data in the source database. Finally, at 1130 a catalog can be updated to note the change to the database and the entry into the snapshot database.

FIG. 12 illustrates a data restoration methodology 1200 in accordance with an aspect of the subject invention. At 1210, each page of data stored in the snapshot database can be written over data in a corresponding location in the primary database. Furthermore, it should be appreciated that the primary files in the database can be expanded if necessary to enable receipt of snapshot data. At 1220, the size of the snapshot database or files therein can be identified and compared to the size of the primary database or corresponding filed therein. If the snapshot database or files therein are smaller than the primary database or files therein signifying that the files should not exist in the restored database than the primary database can be truncated to remove the added data pages. This can correspond to removing the last pages of data in a file as according to an aspect of the invention newly added data is added to at the end of a file. At 1230, open transactions that had not committed at the time the snapshot was created can be retrieved from storage and applied to the primary database being restored. Subsequently, a database log can be retrieved and applied to the restored database at 1240 to further advance the database closer to the event necessitating the restore so as to save as many "good" transactions up to but before occurrence of the event.

Turing to FIG. 13 a data restoration methodology 1300 is depicted in accordance with an aspect of the subject invention. At 1310, a database snapshot is created and maintained. The database snapshot can be created by a user at any time. Furthermore, more than one snapshot can be created so as to provide a plurality of points of reversion over time. The snapshot database can also be created automatically. For example, a monitor component can observe actions with respect to the source or primary database and detect and/or infer actions that may significantly alter the database. For instance, a snapshot could be created automatically upon detection of an installation of a new application. The database snapshot can, according to an aspect of the invention, store changes to the source database. Accordingly, maintaining the database snapshot corresponds to copying changes thereto. According to another aspect of the invention, the snapshot can comprise sparse files thereby storing only changes to corresponding pages and sharing all other data with the primary database. At 1320, the database can be reverted to a prior point in time marked by a snapshot upon the occurrence of an event including but not limited to a user error (e.g., quick finger delete). Reversion or restoration can comprise, inter alia, copying pages from the snapshot database over pages in the primary database, truncating the primary database, applying uncommitted open transactions at the time of snapshot creation to the database, and applying database log information to the primary database to converge upon the event.

Sample Operating Environments

Figure 14:
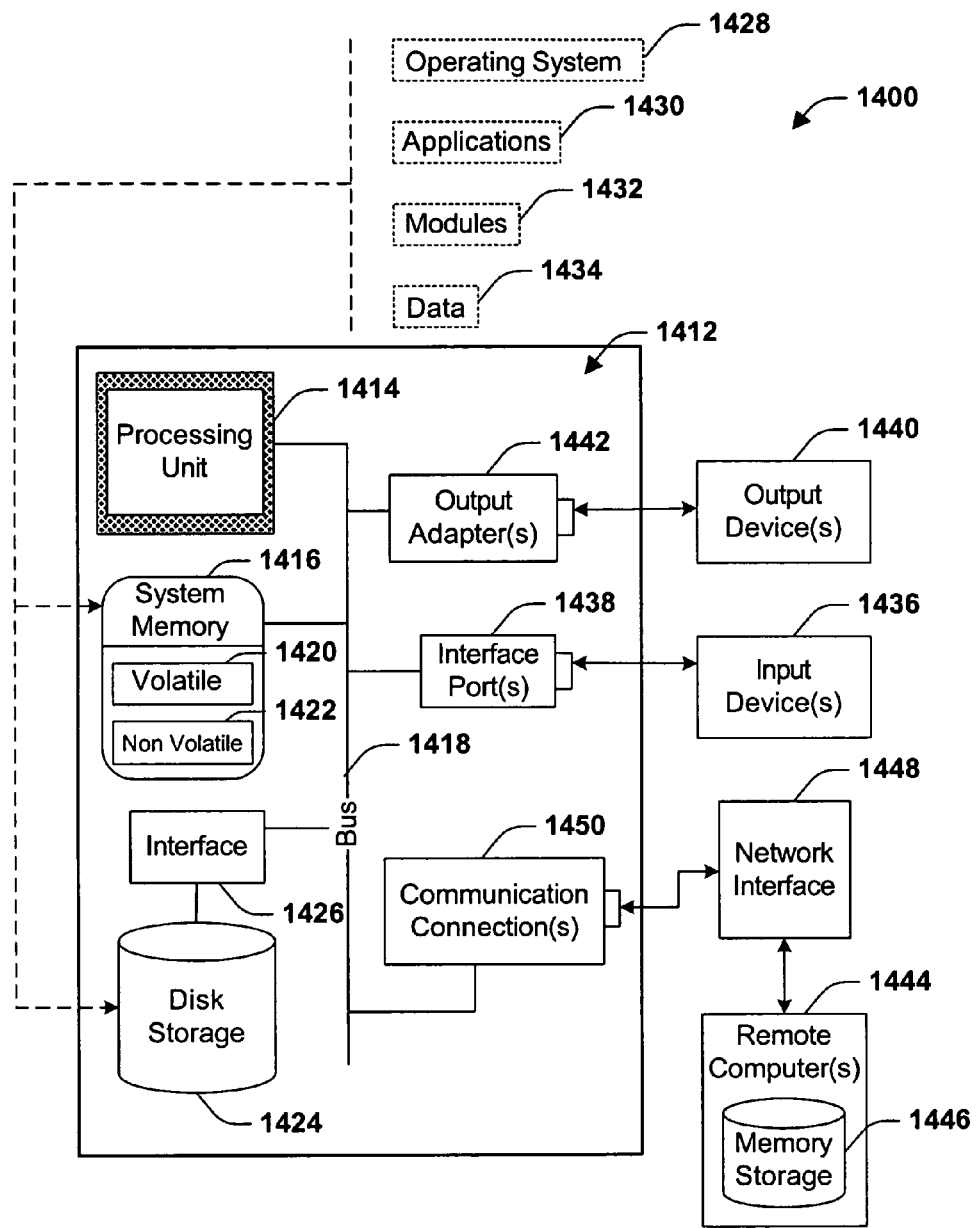
FIG. 14 is a schematic block diagram illustrating a suitable operating environment in accordance with an aspect of the present invention.

In order to provide a context for the various aspects of the invention, FIG. 14 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example disk storage 1424. Disk storage 4124 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. Furthermore, it is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, touch screen, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like monitors, speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, DSL modems, power modems, ISDN adapters, and Ethernet cards.

Figure 15:
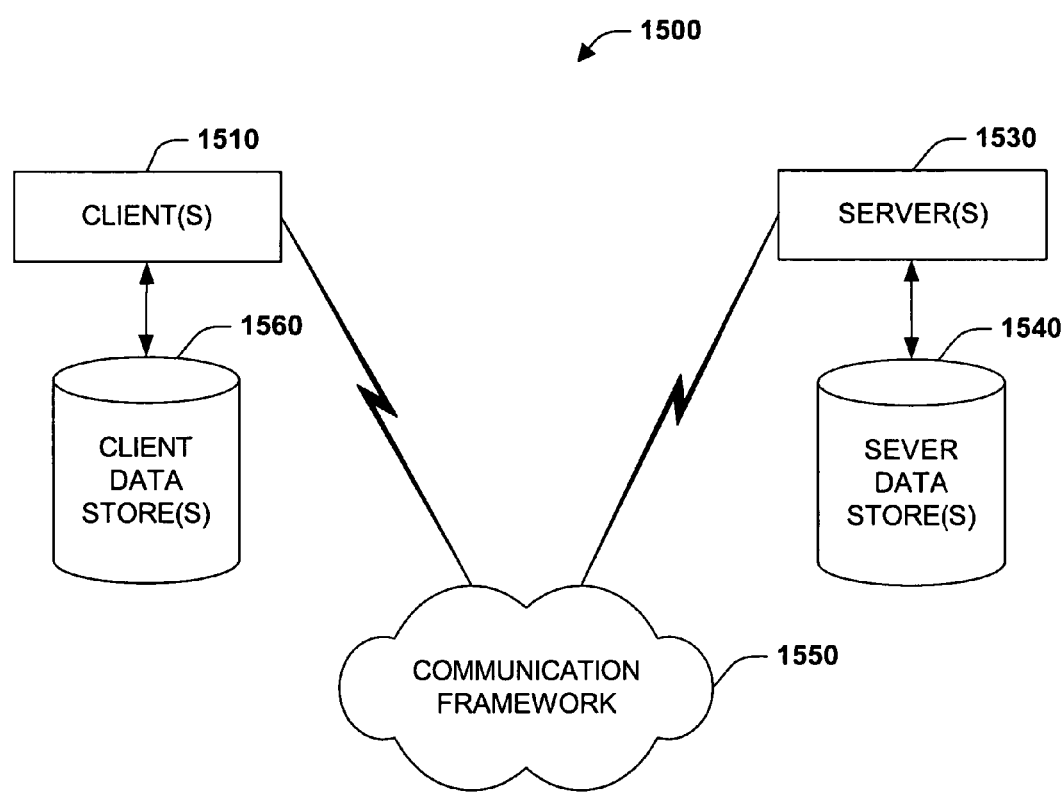
FIG. 15 is a schematic block diagram of a sample-computing environment with which the present invention can interact.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the present invention, for example. One possible communication between a client 1510 and a server 1530 may be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes or having" is used in either the detailed description or the claims, such term is intended to be inclusive in a manner similar to the term "comprising" as "comprising" is interpreted when employed as a transitional word in a claim.

What is claimed is:

1. A computer-implemented data recovery system comprising:
    a processor; and
    a storage device storing executable instructions which, when executed by the processor, implement a method that includes:
    a snapshot component generating a sparse snapshot database from a source database, the sparse snapshot database comprises a sparse file that stores a data object displaced as a result of a modification to the data object in the source database;
    a restore component utilizing the sparse snapshot database to restore the source database to a point in time prior to an event, the restore component comprises a revert component that copies sparse snapshot database data to the source database; and
    a catalog component tracking at least one of whether the data object in the sparse snapshot database is shared with the source database and whether a page in the source database has been copied to the sparse snapshot database.

2. The system of claim 1, the event corresponds to a user error and the data object is at least one of a record, table and index.

3. The system of claim 1, the restore component comprises an undo component that stores open transactions during the creation of the sparse snapshot database and adds them to a restored source database.

4. The system of claim 3, the undo component utilizes database log files to converge upon the error.

5. The system of claim 1, the snapshot component comprising a monitor component that observes the source database and initiates snapshot creation upon the occurrence of an event likely to modify the source database to a particular degree.

6. The system of claim 1, the restore component updates and synchronizes one or more mirror databases automatically and simultaneously with the restore of the source database.

7. A computer-implemented method comprising:
creating a sparse snapshot database that has a structure and a size substantially identical to an original database;
monitoring alterations to the original database and storing a displaced data object in the sparse snapshot database;
reverting back to data at a prior point in time, wherein reverting back includes copying sparse snapshot database files over associated files within the original database; and
capturing and applying open transactions that had not committed at the time of snapshot creation to converge more closely on an error.

8. The method of claim 7, the sparse snapshot database comprises sparse files representing an original value of a data store file prior to being altered.

9. The method of claim 8, the sparse snapshot database and the data store share data that has not changed since creation of the sparse snapshot database.

10. The method of claim 7, further comprising: applying database log files to a data store that facilitates saving good transactions and converging on an event justifying a reversion.

11. A computer-implemented data recovery methodology comprising:
creating a snapshot of a source database, the snapshot consists of sparse files that store a data object displaced as a result of a modification to the object in the source database;
employing artificial intelligence techniques that initiates automatic generation of the snapshot based at least in part on observing transactions with respect to the source database; and
reverting to the snapshot to restore the source database to its state at the point in time when the snapshot was created, by at least copying pages contained in the sparse files over corresponding pages in the source database.

12. The method of claim 11, the snapshot is created automatically upon a detection of an event that may significantly alter a database.

13. The method of claim 12, the event corresponds to installation of a new application.

14. The method of claim 11, the sparse files represent the structure of the database at the time the snapshot was created.

15. The method of claim 14, further comprising applying uncommitted open transactions to the source database.

16. The method of claim 15, further comprising applying a database log file to the database to converge upon an event inspiring the restoration.

17. A computer readable storage device having stored thereon computer executable instructions for carrying out the method of claim 11.

18. A computer-implemented data restoration methodology comprising:
creating a sparse snapshot database for a source database at a point in time, the sparse snapshot database consists essentially of sparse files that store a data object;
copying data to be displaced by transactions committed after the creation of the snapshot to the sparse snapshot database;
evaluating a state of the snapshot database in order to determine whether to revert by at least one of copying the displaced data from the snapshot database to the original database and/or copying the value from the original database to the snapshot database; and
reverting to the state of the source database according to the determination at the time the snapshot was created upon the occurrence of an event, by at least copying pages from a sparse database file over one or more corresponding source database pages.

19. The method of claim 18, the event is a user error.

20. The method of claim 19, the reverting to the state of the source database at the time the snapshot was created is initiated by a database administrator utilizing a graphical user interface.

21. The method of claim 18, a catalog component is utilized to determine which data is shared between a source database and a snapshot database and which data is unique to the snapshot database.

22. The method of claim 18, further comprising capturing uncommitted transactions at the time the snapshot is created.

23. The method of claim 22, further comprising applying the uncommitted transactions to the source database.

24. The method of claim 23, further comprising retrieving a database log and applying the log to the source database to roll the database forward in time to reflect changes to the source database just prior to the occurrence of the event.

25. The method of claim 18, further comprising automatically updating one or more mirror databases automatically upon reversion of the source database.

26. A computer readable storage device having stored thereon computer executable instructions for carrying out the method of claim 18.

* * * * *